(12) United States Patent
Zhang et al.

(10) Patent No.: US 12,299,191 B2
(45) Date of Patent: May 13, 2025

(54) VIRTUAL REALITY SYSTEM WITH INSIDE-OUT SIX DEGREES OF FREEDOM FUNCTION OF THE HEAD AND HANDS

(71) Applicant: Qingdao Pico Technology Co., Ltd., Qingdao (CN)

(72) Inventors: Xiuzhi Zhang, Qingdao (CN); Hongwei Zhou, Qingdao (CN); Guanghui Liu, Qingdao (CN); Hengjiang Guo, Qingdao (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 70 days.

(21) Appl. No.: 17/778,781

(22) PCT Filed: Sep. 15, 2020

(86) PCT No.: PCT/CN2020/115302
§ 371 (c)(1),
(2) Date: May 20, 2022

(87) PCT Pub. No.: WO2021/098358
PCT Pub. Date: May 27, 2021

(65) Prior Publication Data
US 2023/0004218 A1 Jan. 5, 2023

(30) Foreign Application Priority Data
Nov. 21, 2019 (CN) .......................... 201911149777.3

(51) Int. Cl.
*G06F 3/01* (2006.01)
*G02B 27/00* (2006.01)
*G02B 27/01* (2006.01)

(52) U.S. Cl.
CPC ......... *G06F 3/013* (2013.01); *G02B 27/0093* (2013.01); *G02B 27/0101* (2013.01);
(Continued)

(58) Field of Classification Search
CPC ........ G06F 3/013; G06F 3/017; G06F 3/0346; G06F 3/011; G02B 27/0093;
(Continued)

(56) References Cited

U.S. PATENT DOCUMENTS 10,692,288 B1 * 6/2020 Rasmussen ........... A63F 13/213
10,803,663 B2 * 10/2020 Wang ...................... G06F 3/011
(Continued)

FOREIGN PATENT DOCUMENTS

CN 107153369 A 9/2017
CN 109074019 A 12/2018
(Continued)

OTHER PUBLICATIONS

International Search Report issued in corresponding International Application No. PCT/CN2020/115302 dated Dec. 15, 2020.
(Continued)

*Primary Examiner* — Rodney Amadiz
(74) *Attorney, Agent, or Firm* — Astute IP Law Group

(57) ABSTRACT

The present disclosure provides a virtual reality system. The virtual reality system of the disclosure, comprising: a head-mounted display, an input device and a positioning module, wherein the head-mounted display comprises a central processing unit, a camera module connected with the central processing unit and a wireless connection module; the camera module comprises a binocular fisheye camera, an IR camera and a TOF camera, the positioning module comprises a first inertial measurement unit and an electromagnetic receiver provided on the head-mounted display, a second inertial measurement unit and an electromagnetic transmitter provided on the input device; the central processing unit, configured to implement data interaction and command control with the binocular fisheye camera, the IR camera, the TOF camera, the wireless connection module,
(Continued)

the first inertial measurement unit and the electromagnetic receiver.

10 Claims, 5 Drawing Sheets

(52) U.S. Cl.
CPC ....... *G02B 27/017* (2013.01); *G02B 27/0179* (2013.01); *G06F 3/017* (2013.01); *G02B 2027/0132* (2013.01); *G02B 2027/0138* (2013.01); *G02B 2027/014* (2013.01); *G02B 2027/0187* (2013.01)

(58) Field of Classification Search
CPC .............. G02B 27/0101; G02B 27/017; G02B 27/0179; G02B 2027/0132; G02B 2027/0138; G02B 2027/014; G02B 2027/0187; G02B 27/0172
See application file for complete search history.

(56) References Cited

U.S. PATENT DOCUMENTS

| | | | |
|---|---|---|---|
| 2017/0078653 A1* | 3/2017 | Bi | H04N 13/239 |
| 2017/0352184 A1 | 12/2017 | Poulos et al. | |
| 2017/0357332 A1 | 12/2017 | Balan et al. | |
| 2018/0108179 A1* | 4/2018 | Tomlin | G06F 3/0346 |
| 2018/0129276 A1* | 5/2018 | Nguyen | G06F 3/0304 |
| 2019/0004512 A1* | 1/2019 | Liu | G05D 1/0038 |
| 2019/0033989 A1* | 1/2019 | Wang | G06F 3/0346 |
| 2019/0130773 A1* | 5/2019 | Zhu | G06T 7/13 |
| 2019/0187779 A1* | 6/2019 | Miller | G08C 17/02 |
| 2019/0204599 A1* | 7/2019 | Abbott | G06T 19/006 |
| 2019/0278303 A1* | 9/2019 | Zou | G05D 1/0808 |
| 2020/0073486 A1* | 3/2020 | Chan | G06F 3/0346 |
| 2020/0117898 A1* | 4/2020 | Tian | G06F 3/04815 |
| 2020/0335001 A1* | 10/2020 | Freiwirth | A63F 13/211 |
| 2021/0041948 A1* | 2/2021 | Berkner-Cieslicki | G06F 3/011 |
| 2022/0050533 A1* | 2/2022 | Woods | G01S 13/88 |
| 2022/0230383 A1* | 7/2022 | Tian | G06T 19/006 |
| 2023/0218159 A1* | 7/2023 | Eadie | A61B 3/0091 600/558 |

FOREIGN PATENT DOCUMENTS

| | | |
|---|---|---|
| CN | 109613983 A | 4/2019 |
| CN | 109633632 A | 4/2019 |
| CN | 109655789 A | 4/2019 |
| CN | 111061363 A | 4/2020 |

OTHER PUBLICATIONS

Extended European Search Report in EP20890065.4, mailed Oct. 13, 2023, 9 pages.

* cited by examiner

VIRTUAL REALITY SYSTEM WITH INSIDE-OUT SIX DEGREES OF FREEDOM FUNCTION OF THE HEAD AND HANDS

CROSS REFERENCE

This application is the U.S. National Stage of International Application No. PCT/CN2020/115302, filed on Sep. 15, 2020, which claims priority to the Chinese patent application No. 201911149777.3, filed on Nov. 21, 2019, the disclosure of which is incorporated herein by reference in its entirety.

FIELD

The present disclosure relates to a virtual reality system.

BACKGROUND

A virtual reality technology is to use a computer technology to integrate and reconstruct various information such as vision, hearing, touch, etc., so as to generate human-machine interactive virtual scenes. Users can obtain immersive experiences through real-time dynamic three-dimensional images displayed by virtual reality (VR) devices.

In the existing mobile VR all-in-one design, most systems support 6 degrees of freedom, namely 6-DoF function of heads and 3-DoF function of hands. Even if some head-mounted devices support the 6-DoF function of the hands, they are mainly realized based on optical solutions and ultrasonic solutions. These solutions are limited by functions such as field of view (FOV), which cannot adapt to the needs of panoramic PC games.

At present, in an inside-out solution of a mobile terminal, game content is a bottleneck problem. Most 6-DoF games are designed based on PC, and existing mobile terminals that meet the 6-DoF function of the PC games are wired solutions, that is, they are connected with a PC terminal in a wired mode. This wired solution, firstly, is inconvenient to use; secondly, the moving distance is subject to many restrictions; and thirdly, the wired solution is based on the design of an external camera or a light tower, with high cost.

Therefore, there is an urgent need for a solution to meet the needs of the PC games and support inside-out 6 DoF of the heads and 6 DoF of the hands.

SUMMARY

The purpose of the present disclosure is to provide a virtual reality system.

The present disclosure provides a virtual reality system, comprising: a head-mounted display, an input device and a positioning module, wherein the head-mounted display is comprises a central processing unit, a camera module connected with the central processing unit and a wireless connection module;

the camera module comprises a binocular fisheye camera, an IR camera and a TOF camera, the positioning module comprises a first inertial measurement unit provided on the head-mounted display, an electromagnetic receiver provided on the head-mounted display, a second inertial measurement unit provided on the input device and an electromagnetic transmitter provided on the input device; and the central processing unit is further connected with the first inertial measurement unit and the electromagnetic receiver respectively, and configured to implement data interaction and command control with the binocular fisheye camera, the IR camera, the TOF camera, the wireless connection module, the first inertial measurement unit and the electromagnetic receiver, so as to identify 6-DoF spatial positioning of the head-mounted display, 6-DoF spatial positioning of the input device, and implement an obstacle avoidance function, a gesture recognition function, an eyeball tracking function and a wireless transmission function of the virtual reality system.

The present disclosure at least realizes the following technical effects:

1. The present disclosure can implement tracking of a spatial position and a spatial attitude of the virtual reality system through two fisheye cameras and an inertial measurement unit (IMU), and implement high-precision tracking within a 360-degree panoramic range through an input device; and through the combination of the two, the present disclosure can implement position tracking of Roomscale level, and is very suitable for a game scene of Roomscale.

2. The present disclosure can import high-throughput and low-latency wireless data through a wireless connection module, and can apply the virtual reality system to a PC game platform. Combined with the advantages of 6-DoF implementation of the heads and the hands, a practical and convenient head-mounted display (HMD) all-in-one machine with low latency, high precision, and no need to add peripheral batteries can be realized.

3. The present disclosure can implement high-precision plane and obstacle detection by introducing a Time Of Flight (TOF) camera, which can better utilize the use advantages of the Roomscale of the virtual reality system, and can also be used for gesture detection to further increase an interaction mode of the virtual reality system. Moreover, the eyeball tracking function can be implemented through an infrared camera (IR camera), which can realize software interpupillary distance adjustment, and annotation point rendering improves the system frame rate and brings a better Roomscale experience.

BRIEF DESCRIPTION OF THE DRAWINGS

In order to illustrate the technical solutions of the embodiments of the present disclosure more clearly, the accompanying drawings required in the embodiments will be briefly introduced below. It is to be understood that the following drawings illustrate only certain embodiments of the disclosure and are therefore not to be considered limiting of its scope. For those of ordinary skill in the art, other related drawings can also be obtained from these drawings without any creative effort.

DETAILED DESCRIPTION OF THE EMBODIMENTS

Various exemplary embodiments of the present disclosure will now be described in detail with reference to the accompanying drawings. It should be noted that the relative arrangement of components and steps, the numerical expressions and numerical values set forth in these embodiments do not limit the scope of the disclosure unless specifically stated otherwise.

The following description of at least one exemplary embodiment is merely illustrative in nature and is in no way intended to limit the disclosure, its application, or uses.

Techniques, methods, and apparatus known to those of ordinary skill in the relevant art may not be discussed in detail, but where appropriate, techniques, methods, and apparatus should be considered part of the specification.

In all examples shown and discussed herein, any specific values should be construed as illustrative only and not limiting. Accordingly, other instances of the exemplary embodiment may have different values.

It should be noted that like numerals and letters refer to like items in the following figures, so once an item is defined in one figure, it does not require further discussion in subsequent figures.

Figure 1:
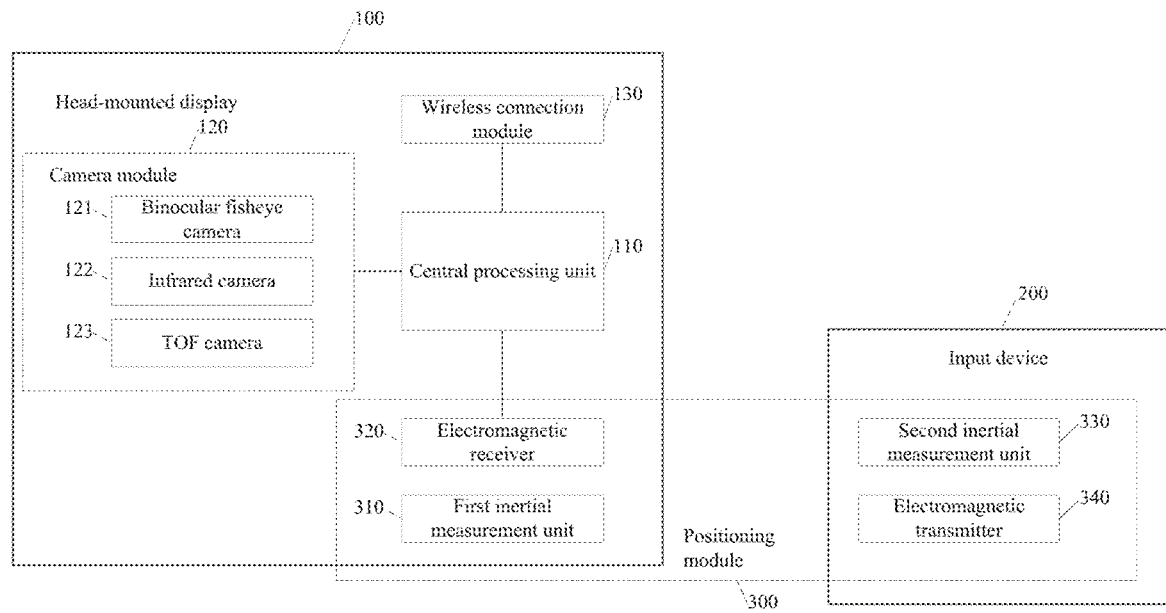
FIG. 1 is a structural block diagram of a virtual reality system shown in an embodiment of the present disclosure.

FIG. 1 is a schematic structural diagram of hardware of a virtual reality system shown in an embodiment of the present disclosure. As shown in FIG. 1, the virtual reality system of the embodiment includes: a head-mounted display 100, an input device 200 and a positioning module 300, and the head-mounted display 100 comprises a central processing unit 110, a camera module 120 connected with the central processing unit 110 and a wireless connection module 130;

the camera module 120 includes a binocular fisheye camera 121, an IR camera 122 and a TOF camera 123, and the positioning module 300 includes a first inertial measurement unit (IMU1) 310 provided on the head-mounted display 100, an electromagnetic receiver 320 provided on the head-mounted display 100, a second inertial measurement unit (IMU2) 330 provided on the input device 200 and an electromagnetic transmitter 340 provided on the input device 200; and the central processing unit 110 is further connected with the IMU1 310 and the electromagnetic receiver 320 respectively, and configured to implement data interaction and command control with the binocular fisheye camera 121, the IR camera 122, the TOF camera 123, the wireless connection module 130, the IMU1 310 and the electromagnetic receiver 320, so as to identify 6-DoF spatial positioning of the head-mounted display, 6-DoF spatial positioning of the input device, and implement an obstacle avoidance function, a gesture recognition function, an eyeball tracking function and a wireless transmission function of the virtual reality system.

The embodiment can implement tracking of a spatial position and a spatial attitude of the virtual reality system through two fisheye cameras and an IMU1, and implement high-precision tracking within a 360-degree panoramic range through the input device; and through the combination of the two, the embodiment can implement position tracking of Roomscale level, and is very suitable for a game scene of Roomscale. The embodiment can import high-throughput and low-latency wireless data through the wireless connection module, and can apply the virtual reality system to a PC game platform. Combined with the advantages of 6-DoF implementation of the heads and the hands, a practical and convenient head-mounted display (HMD) all-in-one machine with low latency, high precision, and no need to add peripheral batteries can be implemented. The embodiment can implement high-precision plane and obstacle detection by introducing the TOF camera, which can better utilize the use advantages of the Roomscale of the virtual reality system, and can also be used for gesture detection to further increase an interaction mode of the virtual reality system. Moreover, the eyeball tracking function can be implemented through the IR camera, which can implement software interpupillary distance adjustment, and annotation point rendering improves the system frame rate and brings a better Roomscale experience.

Figure 2:
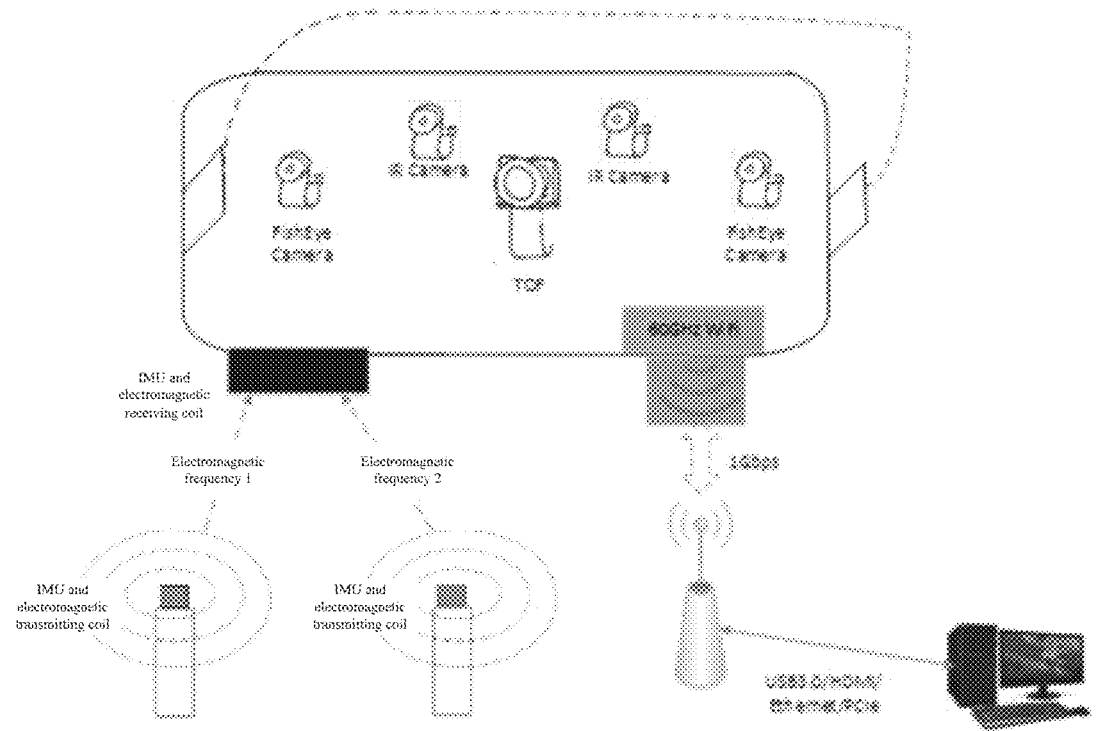
FIG. 2 is a schematic structural diagram of hardware of a virtual reality system shown in an embodiment of the present disclosure.

FIG. 2 is a schematic structural diagram of hardware of a virtual reality system shown in an embodiment of the present disclosure. As shown in FIG. 2, in the embodiment, the fisheye camera, the IR camera, the TOF camera, the wireless connection module (namely 60 GHz Wifi shown in FIG. 2), the IMU1 and the electromagnetic receiver (namely an electromagnetic receiving coil shown in FIG. 2) are provided on the head-mounted display (HMD). However, the IMU2 and the electromagnetic transmitter (namely an electromagnetic transmitting coil shown in FIG. 2) are provided on the input device, namely an electromagnetic handle shown in FIG. 2.

Figure 3:
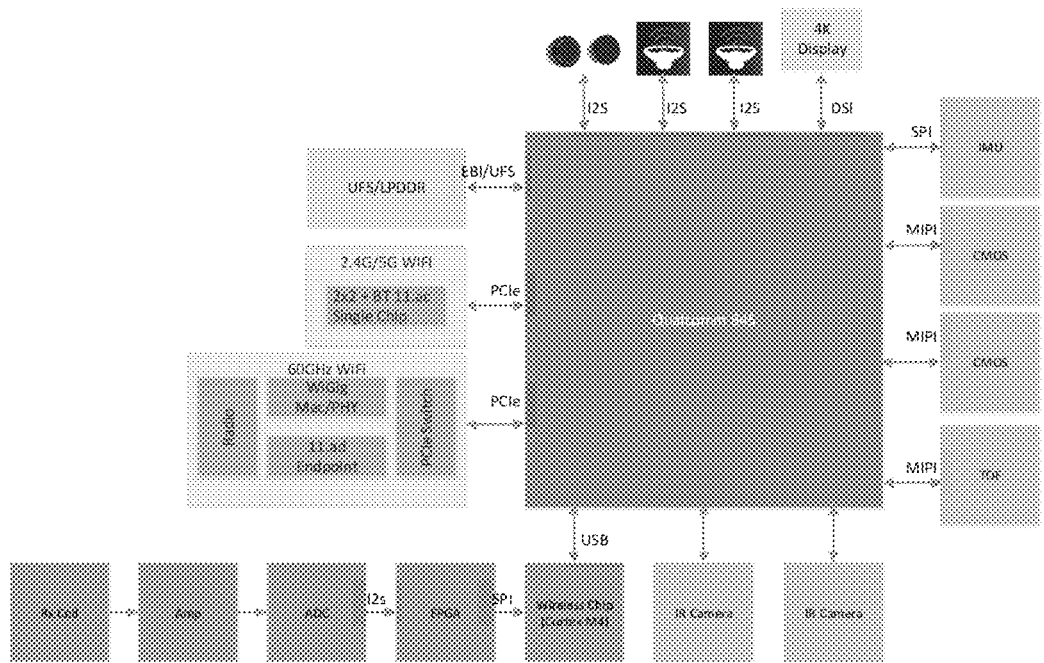
FIG. 3 is a schematic diagram of an electronic circuit of a virtual reality system shown in an embodiment of the present disclosure.

FIG. 3 is a schematic diagram of an electronic circuit of a virtual reality system shown in an embodiment of the present disclosure. As shown in FIG. 3, the central processing unit in the embodiment may be implemented by a chip of a type of Qualcom mm 845, and the wireless connection module may be realized by a 11ad chip. As shown in FIG. 3, the virtual reality system of the embodiment further includes other necessary components, such as a microphone, a loudspeaker, a display supporting 4K (3840*2160) high-definition displaying (namely a 4k Display shown in FIG. 3), a flash memory/dynamic random memory UFS/LPDDR, 2.4G/5G Wifi and various communication lines, I2S (an Inter-IC Sound integrated circuit built-in audio bus), an SPI (serial peripheral interface), an MIPI (mobile industry processor interface) and a USB (universal serial bus) as shown in FIG. 3.

Referring to FIG. 3, in the embodiment, functional components provided on the head-mounted display are connected with a central processing unit chip through corresponding buses and interfaces, such as, the microphone and the loudspeaker which are connected with the central processing unit chip through the I2S, the IMU connected with the central processing unit chip through the SPI, a CMOS (complementary metal-oxide-semiconductor) sensor connected with the central processing unit chip through the MIPI, a wireless connection chip connected with the central processing unit chip through the USB, and the 2.4/5G Wifi and the 60 GHz Wifi which are connected with the central processing unit chip through PCIe (peripheral component interconnect express).

In one embodiment, the binocular fisheye camera is configured to obtain an image and send the image to the central processing unit; the first inertial measurement unit IMU1 is configured to obtain spatial attitude data of the head-mounted display and send the spatial attitude data to the central processing unit; and the central processing unit is configured to identify 6-DoF spatial positioning of the head-mounted display according to the received image and spatial attitude data.

Figure 4:
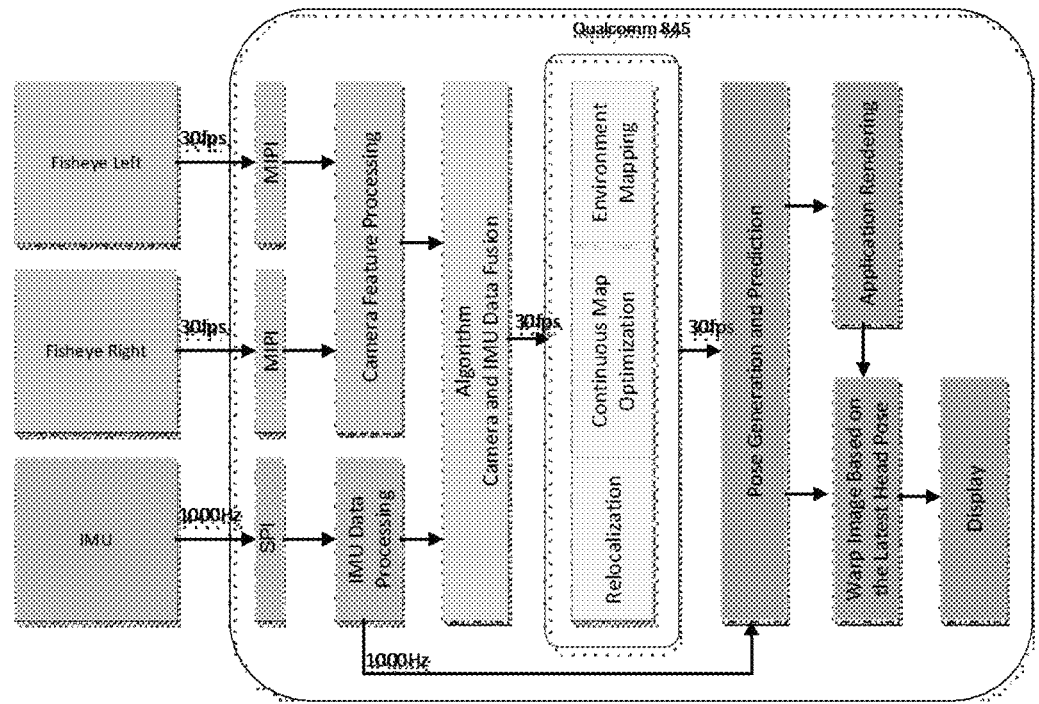
FIG. 4 is a schematic diagram of 6-DoF spatial positioning of a head-mounted display shown in an embodiment of the present disclosure.

As shown in FIG. 4, a frame rate of the data obtained by the fisheye camera is 30 fps, a frequency of the spatial attitude data obtained by the IMU1 is 1000 Hz, and an SLAM (simultaneous localization and mapping) function supporting Roomscale level of the HMD is implemented through the data obtained by the IMU1 and the fisheye camera. Algorithm processing involved runs in the Qualcom mm 845 of the central processing unit.

Referring to FIG. 4, a fisheye left camera and a fisheye right camera obtain image data at the frame rate of 30 fps, and send the image data to the Qualcom mm 845 through the MIPI, the IMU1 obtains the spatial attitude data of the HMD at the frequency of 1000 Hz, and send the spatial attitude data to the Qualcom mm 845 through the SPI, the Qualcom mm 845 performs image processing (namely camera feature processing shown in FIG. 4) on the image data, and performs data processing (namely IMU data processing shown in FIG. 4) on the spatial attitude data. Based on a preset algorithm, the two kinds of data are fused, such as processing of relocalization, continuous map optimization and environment mapping, pose generation and prediction is realized, so that a to-be-corrected image (namely warp image based on the latest head pose shown in FIG. 4) and application rendering are obtained, the to-be-corrected image is corrected by the application rendering, and the corrected image is displayed through a display.

In one embodiment, a wireless transmission module is further provided on the input device and configured to be matched with the wireless connection module on the HMD, so as to implement data wireless transmission between the HMD and the input device:

the IMU2 is configured to obtain spatial attitude data of the input device and send the spatial attitude data to the central processing unit through the wireless transmission module and the wireless connection module;

the electromagnetic transmitter is configured to transmit electromagnetic data;

the electromagnetic receiver is configured to receive the electromagnetic data transmitted by the electromagnetic transmitter and send the electromagnetic data to the central processing unit; and the central processing unit is configured to calculate a relative positional relationship between the input device and the head-mounted display according to the received electromagnetic data, so as to identify the 6-DoF spatial positioning of the input device based on the relative positional relationship and the received spatial attitude data.

Figure 5:
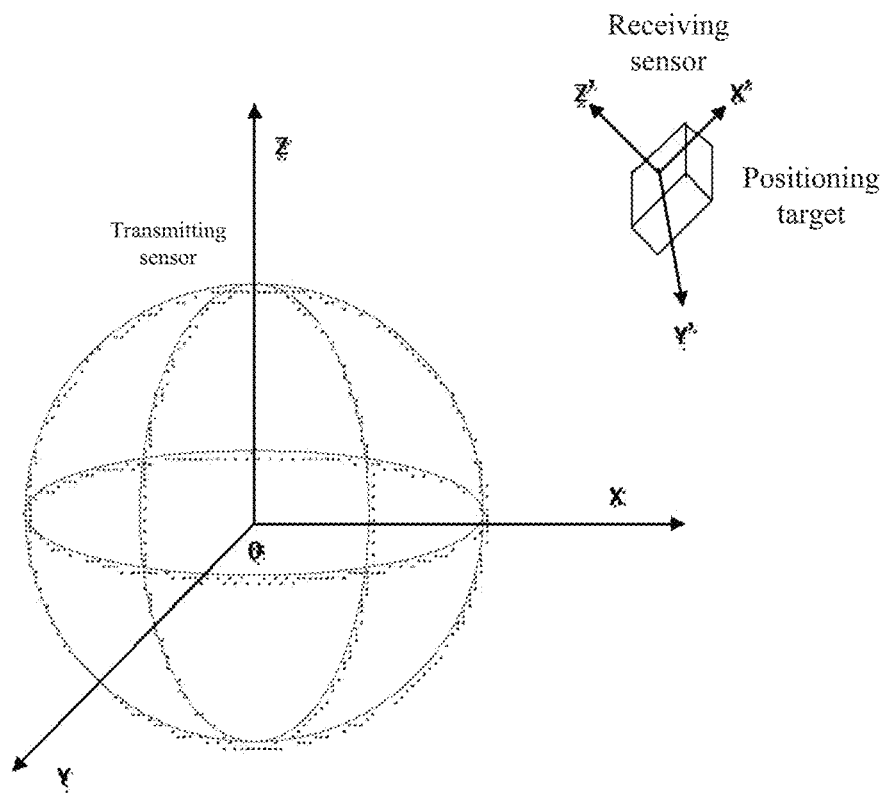
FIG. 5 is a schematic diagram of 6-DoF spatial positioning of an input device shown in an embodiment of the present disclosure.
Figure 6:
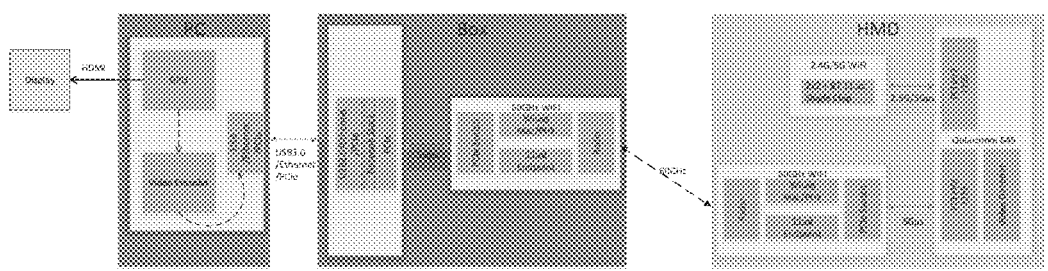
FIG. 6 is a schematic diagram of a wireless streaming function shown in an embodiment of the present disclosure.

The principle of 6-DoF spatial positioning of the input device is shown in FIG. 5. Three sinusoidal signals with different frequencies are generated on an X-axis, a Y-axis and a Z-axis of the electromagnetic transmitter (namely a transmitting sensor shown in FIG. 5), and due to the change of magnetic induction intensity, an induced electromotive force is generated on an X'-axis, a Y'-axis and a Z'-axis of the electromagnetic receiver (namely a receiving sensor shown in FIG. 5). Three inductive signals are received through the electromagnetic receiver, and relative positional information and relative attitude information of the electromagnetic receiver and the electromagnetic transmitter are calculated by a positioning algorithm. Since the electromagnetic transmitter is provided on the input device, the electromagnetic receiver is provided on the HMD, and has a fixed coordinate system relationship with a display screen. A coordinate system relationship between the input device and the display screen may be calculated through coordinate system conversion, so that the 6-DoF spatial positioning of the input device can be implemented, and when the input device comprises the electromagnetic handle, 6-DoF spatial positioning of hands can be implemented.

In one embodiment, the wireless connection module is a wireless connection module with WiGig (wireless gigabit alliance) and Wifi protocols, namely the 60 GHz Wifi shown in FIG. 2. The central processing unit is configured to send 6-Dof spatial positioning data, such as 6-DoF spatial positioning data of the HMD and/or 6-DoF spatial positioning data of the input device, to an opposite terminal device of the virtual reality system, namely a PC device as shown in FIG. 2, through the wireless connection module, so as to enable the opposite terminal device to render and compress a to-be-processed image according to the 6-DoF spatial positioning data, and send the processed image data to the central processing unit through the wireless connection module; and the central processing unit is configured to receive the image data sent by the opposite terminal device through the wireless connection module and displays the image data.

For example, the wireless connection module adopts the 11ad chip, which supports 4.6 Gbps data transmission at most, so as to ensure large data bandwidth and low data transmission delay. The HMD transmits the 6-DoF data to a PC terminal through the 60 GHz Wifi, the PC terminal performs rendering, coding and compression, and then sends the 6-DoF data to the 11ad chip through USB3.0/Ethernet/PCIe, the 11ad chip sends the 6-DoF data to the HMD through the 60 GHz Wifi, and the image may be displayed after decoded by the HMD.

In one embodiment, the TOF camera is configured to obtain a depth image and send the depth image to the central processing unit; and the central processing unit is configured to implement the gesture recognition function according to the depth image.

Figure 7:
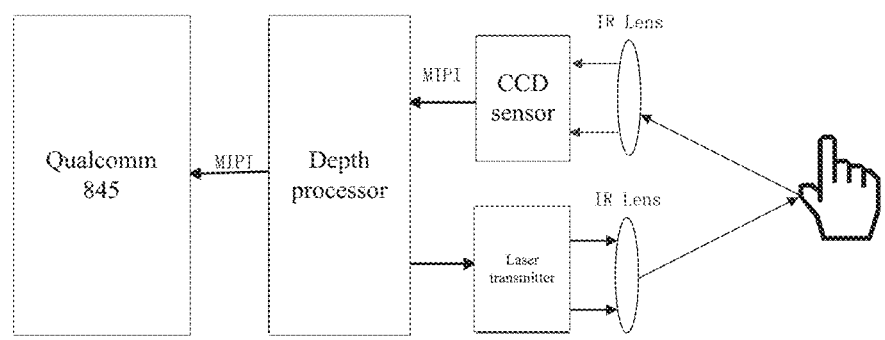
FIG. 7 is a schematic diagram of gesture recognition shown in an embodiment of the present disclosure.

The principle of gesture recognition of the embodiment is as shown in FIG. 7. A depth processor of the TOF camera controls emission time and an emission pulse width of a laser transmitter. A CCD (charge coupled device) sensor is controlled to obtain IR images in different time periods, an infrared image of an external environment and an infrared image after reflection of an object are calculated respectively, so that time of flight (TOF) of reflected lasers at each point of an external object is calculated, depth information of each pixel point may be calculated, after the depth information (640*480) and the IR images (640*480) are combined into an image, the image is sent to the central processing unit, namely the Qualcom mm 845 chip, through the MIPI, and judgment of the gesture recognition function is completed based on a gesture recognition algorithm.

Since the calculation of the depth information depends on the IR images, and the IR images and the depth information are completely synchronized, the gesture recognition function can be better implemented.

In one embodiment, the TOF camera obtains a depth image and sends the depth image to the central processing unit; the binocular fisheye camera obtains an image and sends the image to the central processing unit, and the image includes a gray image; and the central processing unit implements the obstacle avoidance function according to the depth image and the gray image.

Figure 8:
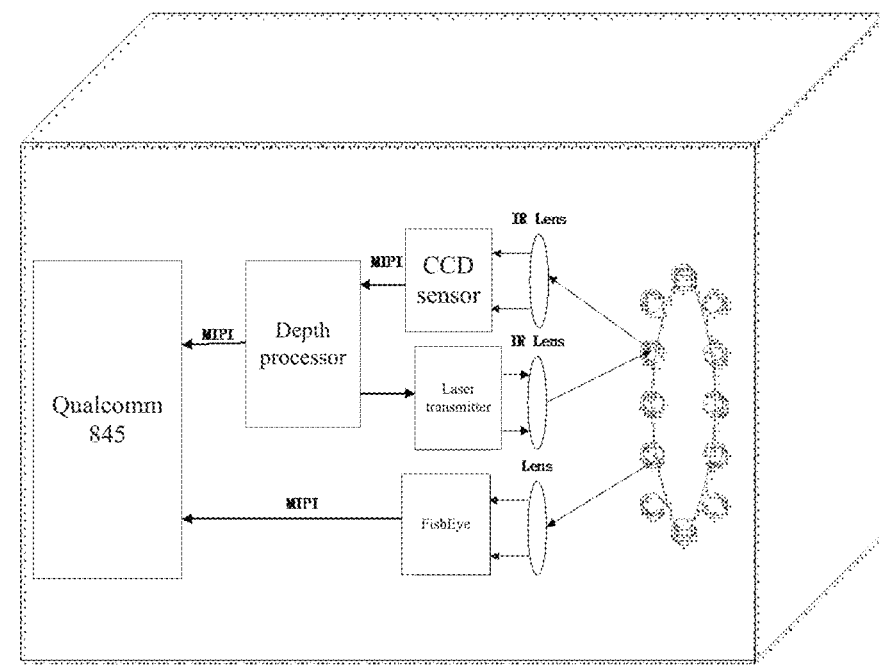
FIG. 8 is a schematic diagram of an obstacle avoidance function shown in an embodiment of the present disclosure.

The implementation principle of the obstacle avoidance function of the embodiment is shown in FIG. 8. In an application scene, if there is an obstacle (such as a conference table), in the process of modeling, contour information of the obstacle is obtained through depth data obtained by the TOF camera. In order to solve the problem of the IR images when the environment is dark, the embodiment obtains the gray image of the obstacle in combination with the fisheye camera, and virtualizes the obstacle into the scene during modeling, so as to implement the accurate obstacle avoidance function of the virtual reality system.

In one embodiment, infrared transmitters are provided around two eye cameras of the HMD, for example, a circle of infrared transmitters are respectively provided around each eye camera, and the infrared transmitters transmit infrared rays to the eyes through the eye cameras; at this time, the infrared camera obtains infrared images of the eyes and sends the infrared images to the central processing unit; and the central processing unit implements the eyeball tracking function according to the infrared images.

Figure 9:
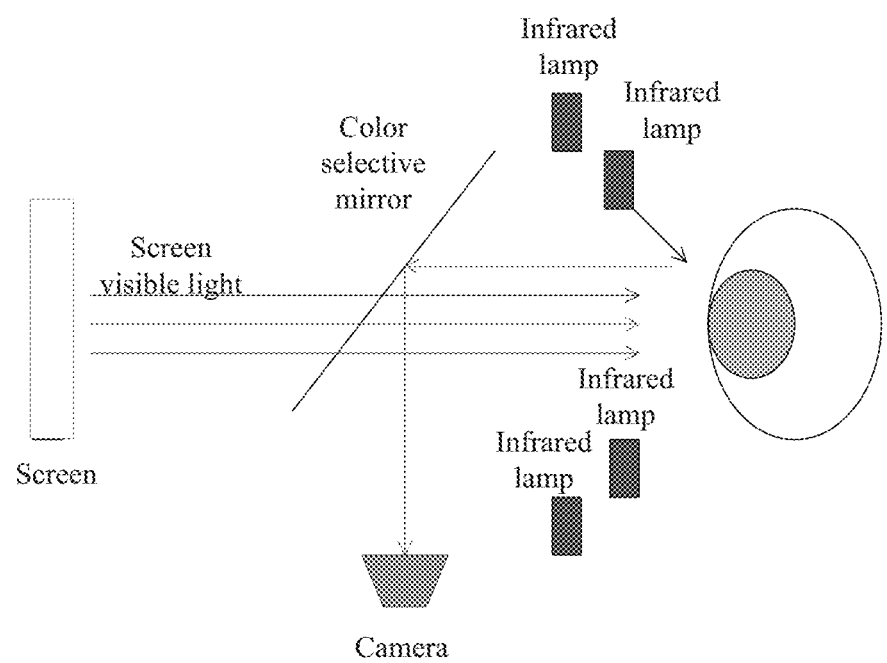
FIG. 9 is a schematic diagram of an eyeball tracking function shown in an embodiment of the present disclosure.

The implementation principle of the eyeball tracking function of the embodiment is shown in FIG. 9. The infrared transmitters integrated in the HMD actively transmit infrared signals, and reflect the infrared signals through a color selective mirror, the two groups of IR cameras provided on corresponding positions of the two eye cameras obtain the IR images and send the IR images to the central processing unit, and the central processing unit analyzes angles of eyeballs through the IR images so as to realize the purpose of eyeball tracking.

To sum up, the embodiment can implement tracking of the spatial position and the spatial attitude of the virtual reality system through the two fisheye cameras and the IMU1, and implement high-precision tracking within the 360-degree panoramic range through the input device; and through the combination of the two, the embodiment can implement position tracking of Roomscale level, and is very suitable for the game scene of Roomscale. The embodiment can import high-throughput and low-latency wireless data through the wireless connection module, and can apply the virtual reality system to a PC game platform. Combined with the advantages of 6-DoF implementation of the heads and the hands, the practical and convenient HMD all-in-one machine with low latency, high precision, and no need to add peripheral batteries can be implemented. The embodiment can implement high-precision plane and obstacle detection by introducing the TOF camera, which can better utilize the use advantages of the Roomscale of the virtual reality system, and can also be used for gesture detection to further increase an interaction mode of the virtual reality system. Moreover, the eyeball tracking function can be implemented through the IR camera, which can implement software interpupillary distance adjustment, and annotation point rendering improves the system frame rate and brings the better Roomscale experience.

In order to clearly describe the technical solutions of the embodiments of the present disclosure, in the embodiments of the present disclosure, words such as "first" and "second" are used to distinguish the same items or similar items that have basically the same functions and functions. Persons can understand that words such as "first" and "second" do not limit the quantity and execution order.

The above descriptions are only specific embodiments of the present disclosure, and those skilled in the art can make other improvements or modifications on the basis of the above embodiments under the above teachings of the present disclosure. Those skilled in the art should understand that the above-mentioned specific description is only for better explaining the purpose of the present disclosure, and the protection scope of the present disclosure is subject to the protection scope of the claims.

What is claimed is:

1. A virtual reality system, comprising:
a head-mounted display, an input device and a positioning module, wherein the head-mounted display comprises a central processing unit, a camera module connected with the central processing unit and a wireless connection module;
the camera module comprises a binocular fisheye camera, an IR camera and a TOF camera, the positioning module comprises a first inertial measurement unit provided on the head-mounted display, an electromagnetic receiver provided on the head-mounted display, a second inertial measurement unit provided on the input device and an electromagnetic transmitter provided on the input device; and
the central processing unit is further connected with the first inertial measurement unit and the electromagnetic receiver respectively, and configured to implement data interaction and command control with the binocular fisheye camera, the IR camera, the TOF camera, the wireless connection module, the first inertial measurement unit and the electromagnetic receiver, so as to identity 6-DoF spatial positioning of the head-mounted display, identify 6-DoF spatial positioning of the input device, and implement an obstacle avoidance function, a gesture recognition function, an eyeball tracking function and a wireless transmission function of the virtual reality system;
wherein to implement the obstacle avoidance function the central processing unit is further configured to:
receive a depth image from the TOF camera;
receive an image from the binocular fisheye camera, wherein the image includes a gray image;
virtualize an obstacle into a scene as a virtualized object based on the depth image and the gray image; and
perform obstacle avoidance based on the virtualized object.

2. The virtual reality system according to claim 1, wherein the binocular fisheye camera is configured to obtain an image and send the image to the central processing unit;
the first inertial measurement unit is configured to obtain spatial attitude data of the head-mounted display and send the spatial attitude data to the central processing unit; and
the central processing unit is configured to identity the 6-DoF spatial positioning of the head-mounted display according to the received image and the spatial attitude data.

3. The virtual reality system according to claim 1, wherein the input device is further provided with a wireless transmission module;
the second inertial measurement unit is configured to obtain spatial attitude data of the input device and send the spatial attitude data to the central processing unit through the wireless transmission module and the wireless connection module;
the electromagnetic transmitter is configured to transmit electromagnetic data;
the electromagnetic receiver is configured to receive the electromagnetic data transmitted by the electromagnetic transmitter and send the electromagnetic data to the central processing unit; and
the central processing unit is configured to calculate a relative positional relationship between the input device and the head-mounted display according to the received electromagnetic data, thereby identify the 6-DoF spatial positioning of the input device based on the relative positional relationship and the received spatial attitude data.

4. The virtual reality system according to claim 3, wherein the input device comprises an electromagnetic handle.

5. The virtual reality system according to claim 1, wherein the wireless connection module comprises WiGig and Wifi protocols.

6. The virtual reality system according to claim 5, wherein the central processing unit is configured to send 6-DoF spatial positioning data to an opposite terminal device of the virtual reality system through the wireless connection module, so as to enable the opposite terminal device to render and compress a to-be-processed image according to the 6-DoF spatial positioning data and send processed image data to the central processing unit through the wireless connection module; and the central processing unit is configured to receive the image data sent by the opposite terminal device through the wireless connection module and displays the image data.

7. The virtual reality system according to claim 1, wherein:

the TOF camera is configured to obtain a depth image and send the depth image to the central processing unit, and the central processing unit is configured to implement the gesture recognition function according to the depth image.

8. The virtual reality system according to claim 1, wherein infrared transmitters are provided around two eye cameras of the head-mounted display respectively;

the infrared transmitters are configured to transmit infrared rays to eyes through the eye cameras;

the IR camera is configured to obtain an infrared image of the eyes and send the infrared image to the central processing unit; and the central processing unit is configured to implement the eyeball tracking function according to the infrared image.

9. The virtual reality system according to claim 8, wherein the head-mounted display comprises two groups of IR cameras, and the two groups of IR cameras are provided in corresponding positions of the two eye cameras respectively.

10. The virtual reality system according to claim 8, further comprising color selective mirrors, wherein each color selective mirror is configured to reflect the infrared rays received from a respective eye to a respective IR camera.

\* \* \* \* \*